US010073204B2

(12) United States Patent
Park et al.

(10) Patent No.: US 10,073,204 B2
(45) Date of Patent: Sep. 11, 2018

(54) OPTICAL FILM STACK INCLUDING RETARDATION LAYER

(71) Applicant: 3M INNOVATIVE PROPERTIES COMPANY, St. Paul, MN (US)

(72) Inventors: Sun-Yong Park, Hwaseong-si (KR); Song-Geun Lee, Youngdeumpo gu Seoul (KR); Matthew B. Johnson, Woodbury, MN (US); Adam D. Haag, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 122 days.

(21) Appl. No.: 15/038,932

(22) PCT Filed: Nov. 24, 2014

(86) PCT No.: PCT/US2014/067165
§ 371 (c)(1),
(2) Date: May 24, 2016

(87) PCT Pub. No.: WO2015/077724
PCT Pub. Date: May 28, 2015

(65) Prior Publication Data
US 2016/0377781 A1 Dec. 29, 2016

Related U.S. Application Data

(60) Provisional application No. 61/908,396, filed on Nov. 25, 2013.

(51) Int. Cl.
*G02F 1/1335* (2006.01)
*G02B 5/30* (2006.01)
(Continued)

(52) U.S. Cl.
CPC .............. *G02B 5/3083* (2013.01); *B32B 7/12* (2013.01); *B32B 23/04* (2013.01); *B32B 23/08* (2013.01);
(Continued)

(58) Field of Classification Search
CPC .................................................. G02F 1/133536
See application file for complete search history.

(56) References Cited

U.S. PATENT DOCUMENTS 5,892,559 A * 4/1999 Sharp ................ G02F 1/133533
349/119
7,486,376 B2 2/2009 Kim
(Continued)

FOREIGN PATENT DOCUMENTS

| CN | 101523250 A | 9/2009 |
| EP | 2 159 610 B1 | 6/2015 |

(Continued)

OTHER PUBLICATIONS

International Search Report for PCT International Application No. PCT/US2014/067165, dated Feb. 19, 2015, 3 pages.

*Primary Examiner* — Kendrick Hsu
(74) *Attorney, Agent, or Firm* — Daniel J. Iden

(57) ABSTRACT

Optical film stacks are described. More particularly, optical film stacks including a half-wave retardation layer are described. Achromatic half-wave retardation layers, including achromatic half-wave layers formed from a quarter-wave and a three-quarters-wave retardation layer, are described. Film stacks including reflective polarizers tuned to reduce wavelength dispersion of the half-wave retardation layer are also described.

9 Claims, 8 Drawing Sheets

(51) Int. Cl.
  *B32B 7/12* (2006.01)
  *B32B 23/04* (2006.01)
  *B32B 23/08* (2006.01)
  *B32B 27/08* (2006.01)
  *B32B 27/30* (2006.01)
  *B32B 27/32* (2006.01)
  *B32B 27/36* (2006.01)
  *G02F 1/13363* (2006.01)
  *G02F 1/1337* (2006.01)

(52) U.S. Cl.
  CPC ............ B32B 27/08 (2013.01); B32B 27/306 (2013.01); B32B 27/327 (2013.01); B32B 27/365 (2013.01); G02B 5/305 (2013.01); G02B 5/3016 (2013.01); G02B 5/3025 (2013.01); G02B 5/3041 (2013.01); G02F 1/13362 (2013.01); G02F 1/13363 (2013.01); G02F 1/133536 (2013.01); *B32B 2255/26* (2013.01); *B32B 2457/202* (2013.01); *B32B 2551/00* (2013.01); *G02F 2001/133545* (2013.01); *G02F 2001/133633* (2013.01); *G02F 2001/133635* (2013.01); *G02F 2001/133638* (2013.01); *G02F 2001/133726* (2013.01); *G02F 2202/28* (2013.01); *G02F 2202/40* (2013.01)

(56) References Cited

U.S. PATENT DOCUMENTS

| | | |
|---|---|---|
| 7,630,134 B2 | 12/2009 | Takahashi |
| 7,633,678 B2 | 12/2009 | Takahashi |
| 7,746,424 B2 | 6/2010 | Kameyama |
| 2003/0090012 A1 | 5/2003 | Allen |

FOREIGN PATENT DOCUMENTS

| | | |
|---|---|---|
| KR | 20120070092 | 6/2012 |
| KR | 101295681 | 8/2013 |
| WO | WO 1995-17691 | 6/1995 |
| WO | WO 2001-79923 | 10/2001 |
| WO | WO 2012-099794 | 7/2012 |

* cited by examiner

OPTICAL FILM STACK INCLUDING RETARDATION LAYER

CROSS REFERENCE TO RELATED APPLICATIONS

This application is a national stage filing under 35 U.S.C. 371 of PCT/US2014/067165, filed Nov. 24, 2014, which claims the benefit of U.S. Provisional Application No. 61/908,396, filed Nov. 25, 2013, the disclosure of which is incorporated by reference in its entirety herein.

BACKGROUND

In backlights, reflective polarizers are used to recycle light and enhance the ultimate efficiency and brightness of the display. Absorbing polarizers or the like are used in conjunction with a liquid crystal module to polarize the light for appropriate modulation by the liquid crystal module. In some manufacturing processes, reflective polarizers in roll form may have their reflective axis (i.e., block axis or slow axis) in the transverse direction (i.e., the width direction of the roll). Absorbing polarizers in roll form have their absorption axis along the length direction of the roll (i.e., machine direction). In cases where it may be desirable to align the reflection axis and the absorption axis within a film stack, one or both of the rolls of polarizers will need to be cut and rotated, adding manufacturing time and process expense.

SUMMARY

In one aspect, the present disclosure relates to an optical film stack. The optical film stack includes a reflective polarizer having a top surface, a bottom surface, a transmission axis, and a reflection axis. The optical film stack also includes an achromatic half-wave retardation layer having a top surface, a bottom surface disposed on the top surface of the reflective polarizer, and a slow axis oriented substantially 45° with respect to the transmission axis of the reflective polarizer. The optical film stack also includes an absorbing polarizer having a bottom surface disposed on the top surface of the achromatic half-wave retardation layer and a transmission axis oriented substantially 90° with respect to the transmission axis of the reflective polarizer.

In another aspect, the present disclosure relates to an optical film stack including a reflective polarizer having a top surface, a bottom surface, a transmission axis, and a reflection axis. The optical film stack also includes a first retardation layer having a top surface, a bottom surface disposed on the top surface of the reflective polarizer, and a slow axis oriented substantially 45° with respect to the transmission axis of the reflective polarizer, and a second retardation layer having a top surface, a bottom surface disposed on the top surface of the first retardation layer, and a slow axis oriented substantially 45° with respect to the transmission axis of the reflective polarizer and oriented substantially 90° with respect to the slow axis of the first retardation layer. The optical film stack also includes an absorbing polarizer having a bottom surface disposed on the top surface of the second retardation layer and a transmission axis oriented substantially 90° with respect to the transmission axis of the reflective polarizer. Together the first and second retardation layers are configured as an achromatic half-wave retardation layer. In some embodiments, the first retardation layer is a three-quarters-wave retardation layer and the second retardation layer is a quarter-wave retardation layer. In some embodiments, the second retardation layer includes a liquid crystal layer. In some embodiments, the first retardation layer includes a film. In some embodiments the liquid crystal layer has a thickness of between 1 and 1.3 microns, and in some embodiments the liquid crystal layer has a thickness of between 1.18 and 1.24 microns.

In yet another aspect, the present disclosure relates to an optical film stack including a tuned reflective polarizer having a top surface, a bottom surface, a transmission axis, and a reflection axis, a half-wave retardation layer having a top surface, a bottom surface disposed on the top surface of the reflective polarizer, and a slow axis oriented substantially 45° with respect to the transmission axis of the reflective polarizer, and an absorbing polarizer having a bottom surface disposed on the top surface of the achromatic half-wave retardation layer and a transmission axis oriented substantially 90° with respect to the transmission axis of the reflective polarizer. The tuned reflective polarizer is tuned to reduce wavelength dispersion of the half-wave retardation layer.

In some embodiments, the optical film stack also includes a quarter-wave retardation layer disposed on the bottom surface of the reflective polarizer. In some embodiments, a retardation value of the achromatic half-wave retardation layer varies directly with a wavelength of visible light. In some embodiments, substantially 45° means not less than 35° and not more than 55°, not less than 40° and not more than 50°, or not less than 44° and not more than 46°. In some embodiments, substantially 90° means not less than 80° and not more than 100°, not less than 85° and not more than 95°, or not less than 89° and not more than 91°. The optical film stack may be in roll form.

DETAILED DESCRIPTION

Figure 1:
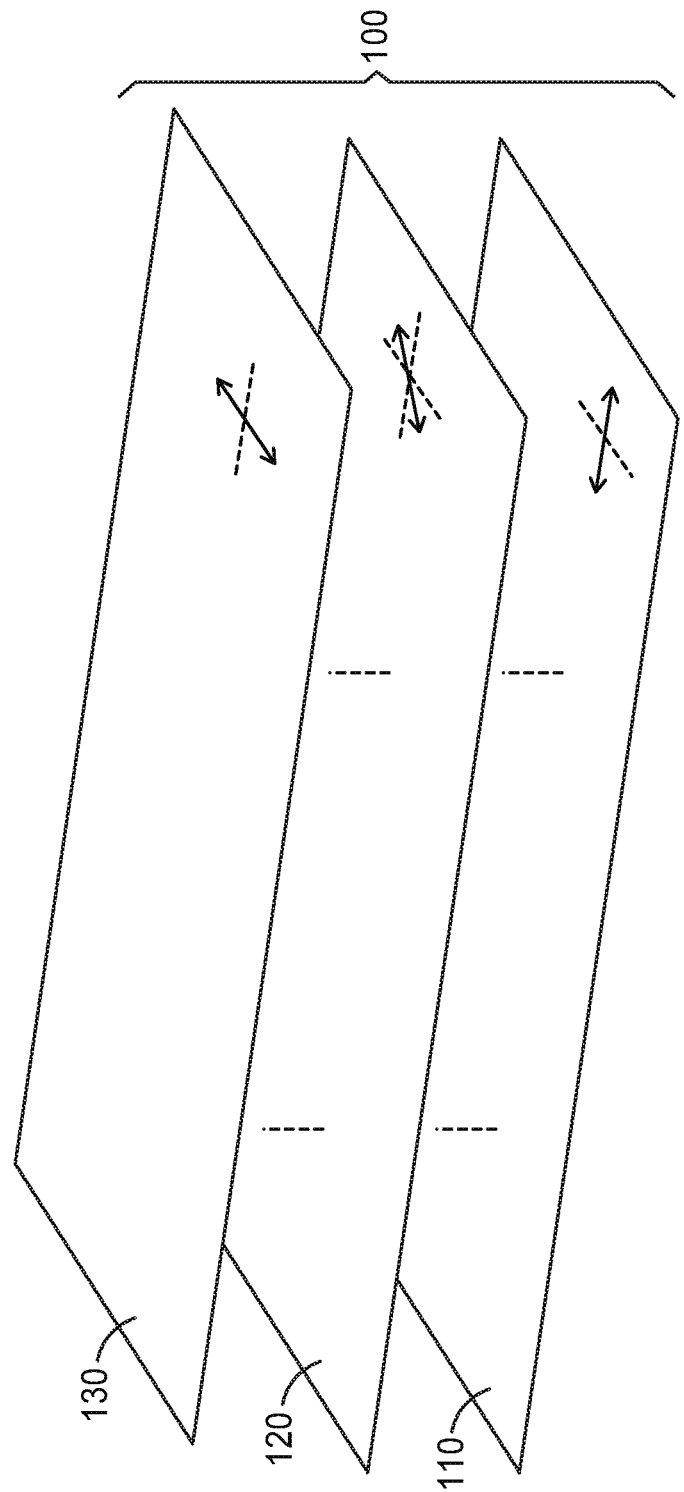
FIG. 1 is an exploded top perspective view of an optical film stack including a retardation layer.

In some backlight applications, it may be useful to utilize an optical film stack that has similar performance to a standard reflective polarizer/absorbing polarizer construction, but is able to be manufactured through a roll to roll process. Further, it may be useful to utilize an optical film stack that uses standard rolls of reflective polarizer film and absorbing polarizer film and can be delivered and stored in roll form.

In conventional manufacturing processes and with conventional material selections, reflective polarizers are stretched such that the reflection axis (that is, the axis parallel to the polarization state preferentially reflected by the reflective polarizer) is along the width direction of the film. In film line parlance, this is referred to as the transverse direction (in contrast to the machine direction, along the length of the film).

Conventional dye-stock absorbing polarizers, in contrast to conventionally manufactured reflective polarizers, are aligned in the machine direction, resulting in its absorption axis being substantially along the length of the absorbing polarizer film.

In some backlights, a liquid crystal module is used to modulate the polarization of light. These liquid crystals may have different orientations and degrees of twist depending on the type of liquid crystal and whether voltage is applied across the liquid crystal module. For example, in a twisted nematic type liquid crystal module, the liquid crystal molecules' structures is such that in an off state (that is, when no voltage is applied), the liquid crystal rotates or modulates the polarization of the light by 90°. In the on state, that is, when sufficient voltage to orient the liquid crystal modules is applied, the liquid crystal molecules are aligned and do not rotate or module that polarization of incident light. In these, crossed polarizers, for example, are disposed on either side of the liquid crystal module. Thus, light may be blocked in the on state because the light remains unmodulated and is extinguished by the polarizer oriented at 90°. Likewise, light may be substantially transmitted in the off state as the polarization is rotated 90° to substantially align with the with the transmission axis of the absorbing polarizer.

In some of these constructions, a reflective polarizer and an absorbing polarizer are disposed on one another in order to provide desirable optical characteristics. For example, a reflective polarizer can be used in conjunction with a highly reflective film or surface, providing a light recycling cavity. Light having a polarization state that is preferentially transmitted through the reflective polarizer is passed while light having an orthogonal polarization state is preferentially reflected. Light having the reflected polarization state may be reflected back and forth (ideally with little absorptive loss) until it has the preferentially transmitted polarization state. This may minimize wasted light that is simply absorbed by an absorbing polarizer, instead ensuring that the maximum useful light is transmitted. The absorbing polarizer may provide helpful anti-reflection or defect hiding properties. Because the reflective polarizer and absorbing polarizer combination effectively functions to select light having a certain polarization state, it may be advantageous to have the reflection and absorption axes, respectively, aligned (or in another sense, to have their transmission axes aligned).

Unfortunately, because conventional manufacturing processes result in rolls having transmission axes oriented orthogonally to one another, there are costly converting steps needed in order to provide a sheet having an absorbing polarizer and a reflective polarizer with their transmission axes aligned. This is generally a sheet to roll lamination process, where the reflective polarizer is cut and rotated 90° in order to align the axes. Not only is this process time-consuming and more expensive, but the converting steps also greatly increase the chance of introducing defects, which may lowers the yield or usable portion of the laminated film stack.

FIG. 1 is an exploded top perspective view of a film stack including a half-wave retardation layer. Film stack 100 includes reflective polarizer 110, half-wave retardation layer 120, and absorbing polarizer 130. The films of film stack 100 are in optical contact with one another: laminated, adhered, or otherwise disposed on each other. In some embodiments, the films or layer of film stack 100 are attached with one or more of a pressure sensitive adhesive, an optically clear adhesive, a UV curable adhesive, or a polyvinyl alcohol type adhesive. In some embodiments the films or layers of film stack 100 are substantially the same dimensions, or coextensive. In some embodiments, the bottom surface of half-wave retardation layer 120 is disposed on the top surface of reflective polarizer 110. And in some embodiments, the bottom surface of absorbing polarizer 130 is disposed on the top surface of half-wave retardation layer 120.

Reflective polarizer 110 may be any suitable reflective polarizer, including a wire-grid polarizer or a multilayer birefringent reflective polarizer. Suitable reflective polarizers include, for example, Dual Brightness Enhancing Film (DBEF) or Advanced Polarizing Film (APF), available from 3M Company, St. Paul, Minn. Reflective polarizer 110 may have a transmission axis generally along the length direction of the film, as shown in FIG. 1. Reflective polarizer 110 may be chosen for other physical or optical characteristics, such as its reflection or transmission spectra, structural durability, or delamination or warp resistance.

Half-wave retardation layer 120 may be any suitable construction. Generally, a half-wave retardation layer includes a layer of a birefringent material. In some embodiments, half-wave retardation layer 120 is liquid crystal polymer coated on a film or substrate, such as a cyclo-olefin polymer substrate, cellulose triacetate (triacetyl cellulose), or polycarbonate. In some embodiments, as depicted in FIG. 1, half-wave retardation layer 120 may have a slow axis oriented substantially 45° to the transmission axis of reflective polarizer 110. For the purposes of this application, an orientation of substantially 45° and substantially 135° may be considered substantially equivalent as between two axes, given the bidirectional nature of a transmission axis. However, substantially 45° and substantially 135° may be used, when comparing three or more axes, to distinguish two axes that may be oriented 90° to one another. Substantially 45° also may be understood to not be limited to precisely 45°; instead, the alignment of the axes may be within 10°, within 5°, or within 1° of 45°. Alignment may in some cases be a tradeoff between manufacturability (e.g., error tolerance) and optical performance, the appropriate balance being determined depending on the desired application. Nonetheless, precise alignment may not in fact be crucial in many applications, as shown in the modeled Examples. For purposes of this application, the terms retarder and retardation layer are used interchangeably.

In some cases half-wave retardation layer 120 may be an achromatic retardation layer. In other words, half-wave retardation layer 120 may rotate or modulate polarization more or less depending on the wavelength of incident light. In some embodiments, as depicted and described in conjunction with FIG. 3, the achromatic half-wave retardation layer may include a two-part construction of two 90°-aligned three-quarters-wave and quarter-wave retardation layers.

Achromatic half-wave retardation layers may be used in some embodiments to compensate for the non-linear wavelength-dependent modulation of light in a conventional half-wave retardation layer, making the transmission instead relatively flat, linear, or in conformance with or approaching any desired spectrum. This may minimize or eliminate shifts in color or other artifacts. In some embodiments the desired achromaticity may be achieved through designing or selecting certain wavelength-specific retardance. For example, the achromatic half-wave retarder may have a retardance (i.e., difference in path length of one of the orthogonal field components of incident light) of 200 nm for 400 nm light and 400 nm for 800 nm light (corresponding to half a wavelength). However, precise linear achromaticity is not necessary in some embodiments, and therefore the actual retardance values may be within 10%, within 7.5%, within 5%, or within 2% of the half wavelength value. Similarly, for quarter-wave and three-quarter wave achromatic retarders, the actual retardance values of these retarders may be within similar percentage ranges of their quarter's and three-quarters' wavelength value, respectively.

In some embodiments, reflective polarizer 110 may be turned, through judicious selection of materials and layer thickness of optical repeat units, to compensate for the wavelength-dependent modulation of a conventional half-wave retardation layer. In other words, the tuned reflective polarizer may be tuned to reduce wavelength dispersion of the half-wave retardation layer. The optical thickness (physical thickness multiplied by the refractive index of a material) of each set of microlayers, called an optical repeat unit, reflects light at wavelengths about twice its optical thickness through constructive interference. In designing a tuned reflective polarizer, the arrangement of these layers may be utilized to provide greater or lesser reflection based on wavelength.

Absorbing polarizer 130 may be any suitable material, including a polymeric material. In some embodiments, absorbing polarizer 130 may include polyvinyl alcohol. In some embodiments, absorbing polarizer may include polarizing elements, including polarizing or dichroic dyes. The polarizing elements may preferentially absorb light of a certain polarization and preferentially transmit light of a second, orthogonal polarization. The transmission axis, as depicted in FIG. 1, is substantially orthogonal to the transmission axis of reflective polarizer 110 and substantially 45° (or 135°) from the slow axis of half-wave retardation layer 120.

In some embodiments, additional or intermediate films, layers, or components may be included; for example, diffusing layers, turning layers, or substrate layers may be appropriate or desirable in some applications. Optical film stack 100 may, in total, be any suitable thickness.

Figure 2:
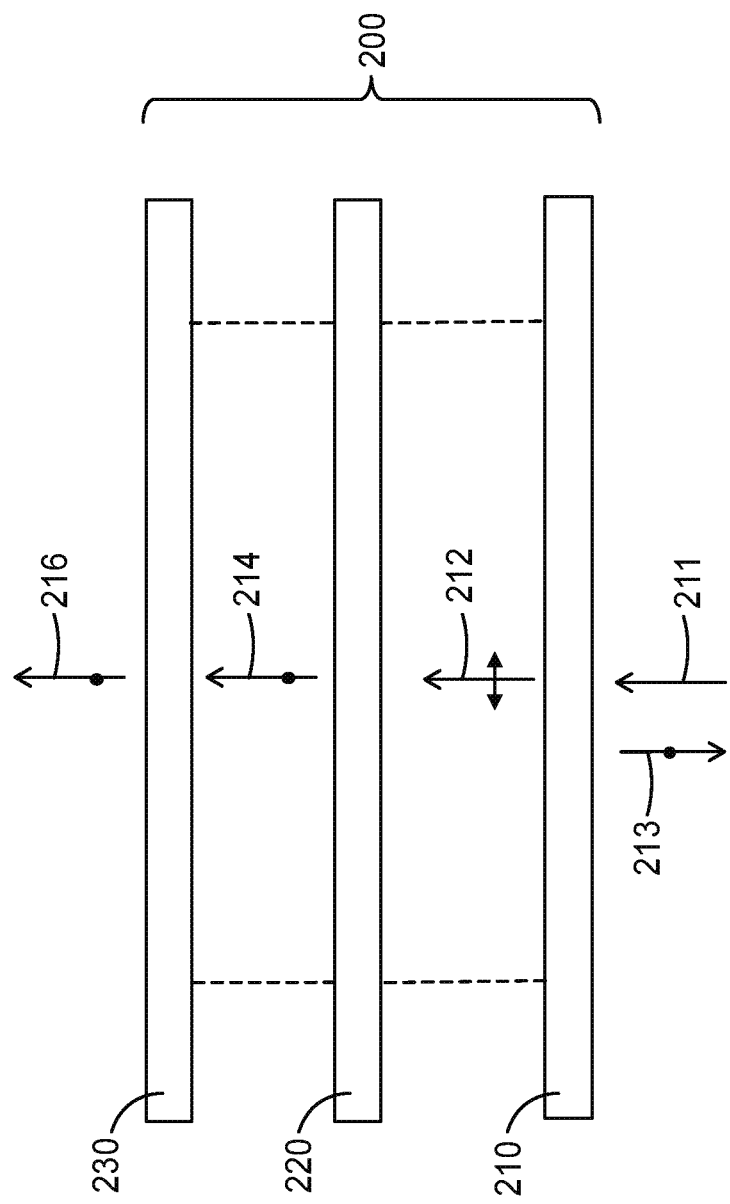
FIG. 2 is an exploded front elevation view of the optical film stack of FIG. 1.

FIG. 2 is a front elevation view of the optical film stack of FIG. 1. Optical film stack 200, corresponding to optical film stack 100 of FIG. 1 includes reflective polarizer 210, half-wave retardation layer 220, and absorbing polarizer 230. Light rays are shown to illustrate the basic optical functionality and mechanism of the optical film stack. Reference to FIG. 1 may be useful to keep in mind the exemplary orientation of the transmission and slow axes of the corresponding layers contemplated in FIG. 2.

Unpolarized light 211 is incident on a first major surface of reflective polarizer 210. Unpolarized light need not have evenly or randomly distributed polarization states; in fact, unpolarized light in some embodiments may actually be at least partially polarized light. However, for the ease of explanation in FIG. 2, and because unpolarized light 211 in FIG. 2 has not yet passed through a polarizer that preferentially transmits a certain polarization state, unpolarized light 211 may be treated as light having an unknown or arbitrary polarization state or distribution of polarization states.

Reflective polarizer 210, corresponding to reflective polarizer 110 in FIG. 1, preferentially transmits light having a polarization state parallel to its transmission axis. Thus, first transmitted light 212 having a first polarization state is preferentially transmitted. Light having an orthogonal polarization state to the transmission axis of reflective polarizer 210 is preferentially reflected as reflected light 213. Note that in some embodiments the reflection or transmission ratios may vary based on wavelength or incidence angle, so in some embodiments both polarization states may be at least partially transmitted and at least partially reflected. In some embodiments, this phenomenon may be exploited to control color or output angles.

First transmitted light 212 is incident on half-wave retardation layer 220. Half-wave retardation layer 220 is configured to rotate or modulate the polarization of first transmitted light 212 to orthogonally polarized second transmitted light 214. For purposes of this application, rotate and modulate are used to describe the overall effect of polarization state change; however, one skilled in the art will understand that the particular mechanisms, e.g., axis-specific retardation based on in-plane birefringence versus rotation due to helical liquid crystal structure may be interchanged or combined in some embodiments without changing terminology. As described in conjunction with FIG. 1, in some embodiments this polarization rotation may be wavelength dependent, so achromatic half-wave retardation layers—that is, half-wave retardation layers that alter this wavelength-dependent rotation—may be utilized.

Overall, second transmitted light 214 is transmitted through half-wave retardation layer 220, now having an orthogonally oriented polarization state to first transmitted light 212. In some embodiments, second transmitted light 214 may desirably be of similar intensity as first transmitted light 212, requiring low absorptive or reflective losses from half-wave retardation layer 220. Second transmitted light 214 is thereafter incident on absorbing polarizer 230, which, referring again to FIG. 1, has a transmission axis oriented orthogonally to reflective polarizer 210. Because of the polarization rotation from half-wave retardation layer 220, however, the polarization state of light transmitted through reflective polarizer 210 is similarly oriented orthogonally to light incident on (and ultimately transmitted through) absorbing polarizer 230.

Absorbing polarizer 230 need not in fact be an absorbing polarizer; however, in some embodiments it may be desirable to minimize potentially distracting reflection in certain backlight configurations by configuring it as an absorbing polarizer. In some embodiments, the half-wave retardation layer 220 may transmit an appropriate distribution of polarization states as a function of wavelength for second transmitted light 214 so that output light 216 has a desired brightness or color performance. Nonetheless, output light 216 is transmitted through absorbing 216 and in some embodiments may be further incident on other films or backlight components, including a pixilated liquid crystal display. Essentially, together, reflective polarizer 210 and half-wave retardation layer 220 function to simulate a transmission axis oriented orthogonally to the actual transmission axis of reflective polarizer 210. Viewed differently, absorbing polarizer 230 and half-wave retardation layer 220 function together to simulate a transmission axis oriented orthogonally to the actual transmission axis of absorbing polarizer 230.

Figure 3:
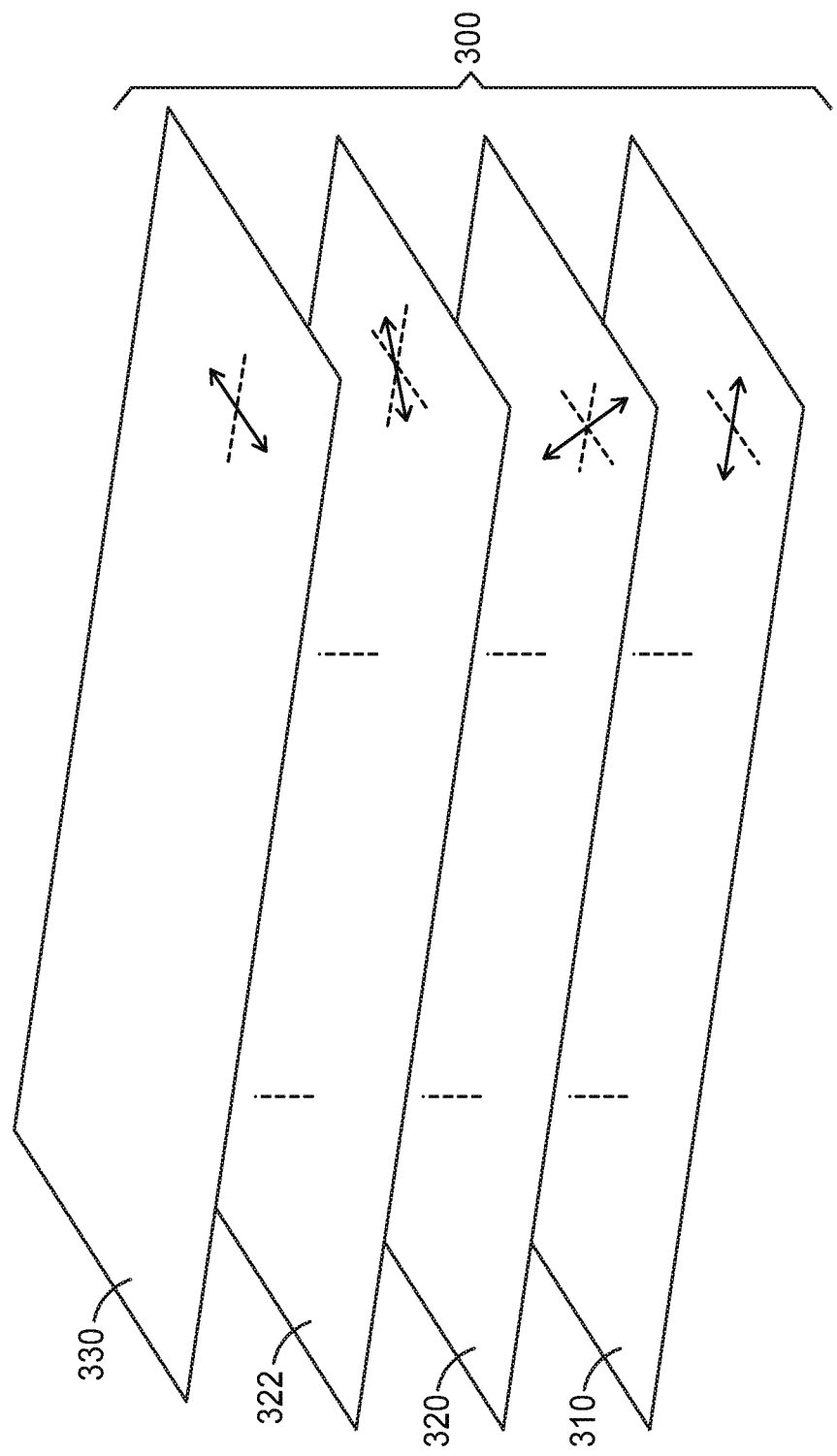
FIG. 3 is an exploded top perspective view of another optical film stack including a retardation layer.

FIG. 3 is an exploded top perspective view of another optical film stack including a retardation layer. In a sense FIG. 3 shows optical film stack 300 including reflective polarizer 310, retarder film layer 320, liquid crystal layer 322 and absorbing polarizer 330. The function and configuration of optical film stack 300 is similar to optical film stack 100 in FIG. 1; however, retarder film layer 320 and liquid crystal layer 322 are used instead of half-wave retardation layer 120. This split into two layers in the view of FIG. 3 is for ease of explanation and the configuration described with respect to this figure may apply equally where a single-layer half-wave retardation layer is referenced. In other words, the two-layer construction described in FIG. 3 may be functionally equivalent to a single-layer configuration and may be substituted as appropriate. The bottom surface of retarder film layer 320 may be disposed on the top surface of reflective polarizer 310, the bottom surface of liquid crystal layer 322 may be disposed on the top surface of retarder film layer 320, and the bottom surface of absorbing polarizer 330 may be disposed on the top of liquid crystal layer 322. As with other embodiments in this disclosure, suitable adhesives, including optically clear and pressure sensitive adhesives, laminations, or other attachment mechanisms may be used, the layers still being considered disposed on one another.

Retarder film layer 320 may in some embodiments be a three-quarter wave retardation layer. In some embodiments, retarder film layer 320 may be a cyclo-olefin polymer retardation layer. The slow axis of retarder film layer 320 may be oriented as depicted in FIG. 3; that is, substantially 45° from the transmission axis of reflective polarizer 310.

Liquid crystal layer 322 is disposed on retarder film layer 320 and may function as a quarter wave retardation layer, with its slow axis oriented orthogonally to the slow axis of retarder film layer 320. In some embodiments, liquid crystal layer 322 may be essentially a liquid crystal coating on retarder film layer 320. In some embodiments, liquid crystal layer 322 may include reactive mesogen liquid crystal. In some embodiments, the alignment and thickness of liquid crystal layer 322 may be designed or selected in order to simulate a half-wave retardation layer in conjunction with retarder film layer 320. In some embodiments, these characteristics of liquid crystal layer may be selected to provide, in conjunction with retarder film layer 320, an achromatic half-wave retardation layer as described elsewhere. Intricate control of the overall properties of the optical film stack may be possible through the material selection, alignment, and thickness of the liquid crystal layer 322. Therefore, in some embodiments, liquid crystal layer 322 may be designed or adjusted to provide desired color performance or brightness.

EXAMPLES

Example 1

Simulations were performed to determine transmittance as a function of wavelength for film stacks used in LCD displays. The simulations were carried out using TechWiz LCD 1D Plus, which is simulation software commercially available from Sanayi System Co. Ltd. (Incheon, Korea). The Lambertian light source option provided by the TechWiz Database was used in all simulations.

The film stacks included a retarder between an absorbing polarizer and a reflective polarizer where the polarizers were disposed such that the pass axis of the reflective polarizer was orthogonal to the pass axis of the absorbing polarizer. The retarder was modeled as a ¾ wavelength cyclo-olefin polymer (COP) retarder with a liquid crystal (LC) polymer retarder deposited on the COP retarder such that the slow axis of the LC retarder was at 90 degrees relative to the slow axis of the COP retarder. The ¾ wavelength retarder was disposed so that its slow axis was at 45 degrees relative to the pass axis of the reflective polarizer and the LC retarder was disposed so that its slow axis was at −45 degrees relative to the pass axis of the reflective polarizer.

The film stacks modeled in the simulation used a COP retarder with the indices of refraction given in Table 1, which were chosen as representative of a COP retarder available commercially from Zeon Corp. The x-axis refers to the slow axis, the y-axis is perpendicular to the slow axis and in the plane of the retarder film, and the z-axis is in the thickness direction.

TABLE 1

| Wavelength (nm) | $n_x$ | $n_y$ | $n_z$ |
| --- | --- | --- | --- |
| 450 | 1.52552 | 1.51847 | 1.51621 |
| 550 | 1.52539 | 1.51842 | 1.51619 |
| 650 | 1.52534 | 1.51839 | 1.51618 |

To simulate a ¾ wavelength retarder, the thickness, d, of the COP retarder was taken to be 70 microns which gave the retardation values shown in Table 2, where Re=$(n_x-n_y)$d and Rth=$[(n_x+n_y)/2-n_z]$d.

TABLE 2

| Wavelength (nm) | Re (nm) | Rth (nm) |
| --- | --- | --- |
| 450 | 493.5 | 404.9 |
| 550 | 487.9 | 400.1 |
| 650 | 486.5 | 397.9 |

The LC used in the LC retarder was taken to be 5CB (4-pentyl-4'-cyanobiphenyl) having the extraordinary ($n_e$) and ordinary ($n_o$) indices of refraction given in Table 3.

TABLE 3

| Wavelength (nm) | $n_e$ | $n_o$ |
| --- | --- | --- |
| 450 | 1.76933 | 1.55909 |
| 550 | 1.72380 | 1.53983 |
| 650 | 1.70342 | 1.53069 |

The thickness of the LC layer was varied from 1.04 microns to 1.28 microns in the simulations. The retardation at 1.04 microns is given in Table 4 and the retardation at 1.28 microns is given in Table 5.

TABLE 4

| Wavelength (nm) | Re (nm) | Rth (nm) |
| --- | --- | --- |
| 450 | 218.6 | 109.3 |
| 550 | 191.3 | 95.7 |
| 650 | 179.6 | 89.8 |

TABLE 5

| Wavelength (nm) | Re (nm) | Rth (nm) |
| --- | --- | --- |
| 450 | 269.1 | 134.6 |
| 550 | 235.5 | 117.7 |
| 650 | 221.1 | 110.5 |

For comparison, a COP retarder film with the indices of refraction given in Table 1 with a thickness of 39 microns was modeled. This provided an approximately ½ wave retarder with the retardation values given in Table 6.

TABLE 6

| Wavelength (nm) | Re (nm) | Rth (nm) |
|---|---|---|
| 450 | 275.0 | 225.6 |
| 550 | 271.8 | 222.9 |
| 650 | 271.1 | 221.7 |

The conventional structure of a reflective polarizer and an absorbing polarizer without a retarder between the two polarizers and with the pass axis of the reflective polarizer and the absorbing polarizer aligned was also simulated.

Figure 4:
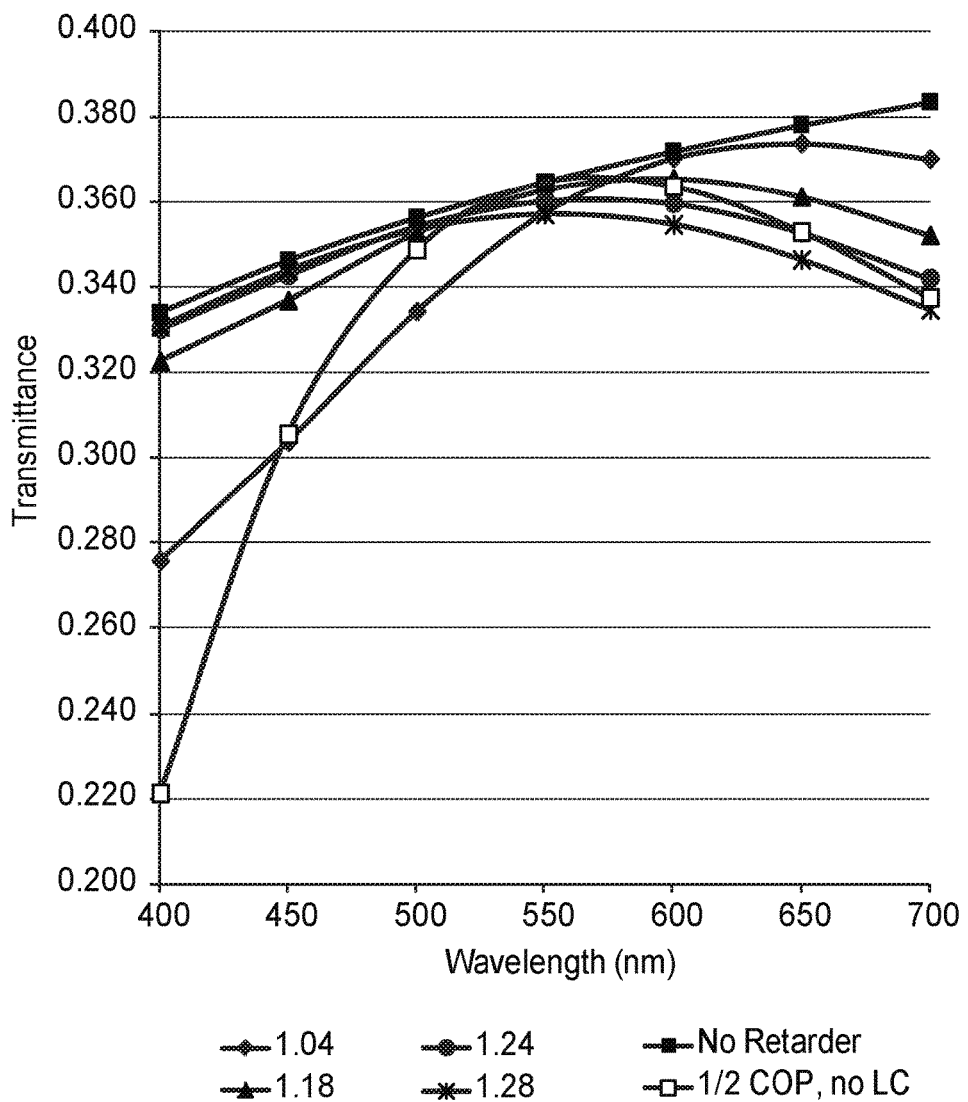
FIG. 4 is a graph showing transmittance as a function of wavelength for various thicknesses of liquid crystal polymer in exemplary optical film stacks.

The transmittance as a function of wavelength for various thicknesses of the LC layer is provided in Table 7 and in FIG. 4. It can be seen that compared to the case of no retarder, the ½ wave COP retarder produced a strong wavelength dependence. The use of achromatic retarders significantly improved the results.

TABLE 7

| LC Thickness | Wavelength (nm) | | | | | | |
|---|---|---|---|---|---|---|---|
| (microns) | 400 | 450 | 500 | 550 | 600 | 650 | 700 |
| 1.04 | 0.276 | 0.304 | 0.334 | 0.357 | 0.370 | 0.374 | 0.370 |
| 1.06 | 0.285 | 0.310 | 0.338 | 0.359 | 0.370 | 0.372 | 0.368 |
| 1.08 | 0.293 | 0.316 | 0.341 | 0.360 | 0.370 | 0.371 | 0.366 |
| 1.1 | 0.300 | 0.321 | 0.344 | 0.362 | 0.370 | 0.369 | 0.363 |
| 1.12 | 0.307 | 0.326 | 0.347 | 0.362 | 0.369 | 0.368 | 0.361 |
| 1.14 | 0.313 | 0.330 | 0.349 | 0.363 | 0.368 | 0.366 | 0.358 |
| 1.16 | 0.318 | 0.334 | 0.351 | 0.363 | 0.367 | 0.363 | 0.355 |
| 1.18 | 0.323 | 0.337 | 0.352 | 0.363 | 0.365 | 0.361 | 0.352 |
| 1.2 | 0.326 | 0.339 | 0.353 | 0.362 | 0.364 | 0.358 | 0.349 |
| 1.22 | 0.328 | 0.341 | 0.354 | 0.361 | 0.362 | 0.356 | 0.345 |
| 1.24 | 0.330 | 0.343 | 0.354 | 0.360 | 0.360 | 0.353 | 0.342 |
| 1.26 | 0.331 | 0.344 | 0.354 | 0.359 | 0.357 | 0.350 | 0.338 |
| 1.28 | 0.331 | 0.344 | 0.353 | 0.357 | 0.354 | 0.346 | 0.335 |
| No retarder | 0.334 | 0.346 | 0.356 | 0.365 | 0.372 | 0.378 | 0.383 |
| ½ wave COP, no LC | 0.221 | 0.306 | 0.349 | 0.364 | 0.363 | 0.353 | 0.337 |

Color was characterized in terms of CIE Chromaticity Yxy coordinates. The color shift parameters Δx and Δy relative to the case with aligned reflective and absorbing polarizer without a retarder is given in Table 8 and in FIG. 5 for on-axis viewing (angular coordinates: Θ=0°, Φ=0°), horizontal off-axis viewing (angular coordinates: Θ=45°, Φ=0°), and diagonal off-axis viewing (angular coordinates: Θ=45°, Φ=45°). The case of aligned polarizers with no retarder has a color shift of zero by definition, while the case of a ½ wave COP retarder between rotated polarizers has off axis color shifts that are off the scale of FIG. 5.

TABLE 8

| LC Thickness | Θ = 0°, Φ = 0° (On-axis) | | Θ = 45°, Φ = 0° (Horizontal off-axis) | | Θ = 45°, Φ = 45° (Diagonal off-axis) | |
|---|---|---|---|---|---|---|
| (microns) | Δx | Δy | Δx | Δy | Δx | Δy |
| 1.04 | 0.0094 | 0.012 | 0.0137 | 0.0144 | −0.0118 | −0.0061 |
| 1.06 | 0.0077 | 0.0103 | 0.0119 | 0.0126 | −0.0113 | −0.0053 |
| 1.08 | 0.0062 | 0.0088 | 0.0103 | 0.0109 | −0.0106 | −0.0044 |
| 1.1 | 0.0047 | 0.0073 | 0.0087 | 0.0094 | −0.0099 | −0.0033 |
| 1.12 | 0.0034 | 0.0059 | 0.0072 | 0.0079 | −0.0091 | −0.002 |
| 1.14 | 0.0021 | 0.0047 | 0.0058 | 0.0066 | −0.0081 | −0.0006 |
| 1.16 | 0.0009 | 0.0035 | 0.0046 | 0.0053 | −0.007 | 0.0009 |
| 1.18 | −0.0002 | 0.0024 | 0.0034 | 0.0041 | −0.0057 | 0.0027 |
| 1.2 | −0.0012 | 0.0014 | 0.0023 | 0.0031 | −0.0043 | 0.0046 |
| 1.22 | −0.0021 | 0.0005 | 0.0013 | 0.0021 | −0.0027 | 0.0067 |
| 1.24 | −0.003 | −0.0003 | 0.0003 | 0.0012 | −0.001 | 0.009 |
| 1.26 | −0.0038 | −0.001 | −0.0005 | 0.0004 | 0.001 | 0.0116 |
| 1.28 | −0.0045 | −0.0016 | −0.0013 | −0.0003 | 0.0031 | 0.0143 |
| ½ wave COP, no LC | 0.0054 | 0.0144 | 0.0081 | 0.0173 | −0.017 | −0.011 |

Example 2

Simulations were performed as in Example 1, except that the thickness of the LC retarder was fixed at 1.22 microns and the angle between the slow axis of the COP retarder and the pass axis of the reflective polarizer (hereinafter, the COP angle) was varied from 45 to 60 degrees. The angle between the slow axis of the LC retarder and the pass axis of the reflective polarizer (hereinafter, the LC angle) was varied from −45 to −30 degrees keeping the relative angle between the slow axis of the COP retarder and the slow axis of the LC retarder at 90 degrees (i.e., the LC angle was the COP angle minus 90 degrees).

Figure 6:
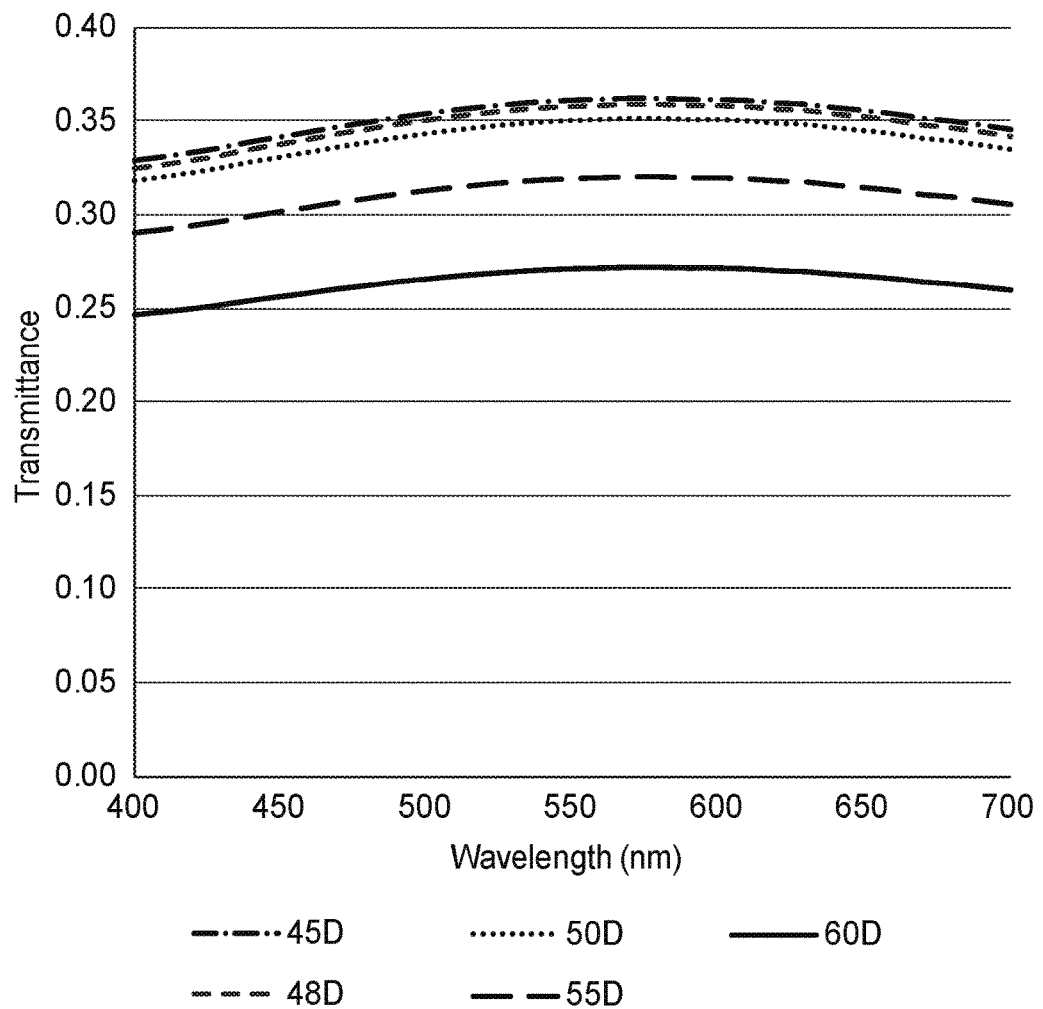
FIG. 6 is a graph showing transmittance as a function of wavelength for different retarder alignments.

Transmittance versus wavelength for several different COP angles is shown in FIG. 6. The relative transmittance (relative to the COP angle of 45 degrees) is given in Table 9. From FIG. 6 and Table 9, it can be seen that the relative transmittances initially drop very slowly as the COP angle moves away from 45 degrees.

TABLE 9

| | COP Angle (deg.) | | | | | | |
|---|---|---|---|---|---|---|---|
| | 45 | 46 | 47 | 48 | 50 | 55 | 60 |
| Relative Transmittance (%) | 100 | 100 | 100 | 99 | 97 | 88 | 75 |

Figure 7:
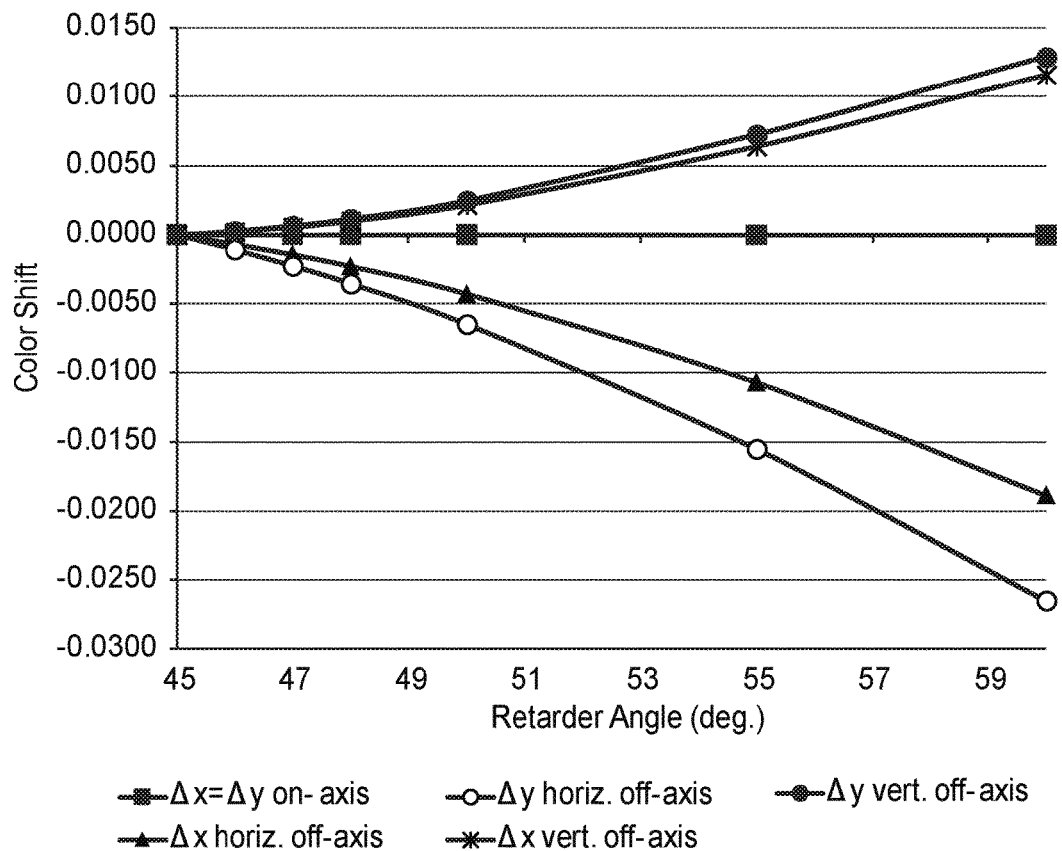
FIG. 7 is a graph showing color shift as a function of retarder alignment for different viewing angles.

The color shift relative to the case where the COP angle is 45 degrees is given in Table 10 and FIG. 7 where it can be seen that the color shift is not very sensitive to COP angle for angles between 45 degrees and about 50 degrees.

TABLE 10

| COP Angle | Θ = 0°, Φ = 0° (On-axis) | | Θ = 45°, Φ = 0° (Horizontal off-axis) | | Θ = 45°, Φ = 45° (Diagonal off-axis) | |
|---|---|---|---|---|---|---|
| (deg.) | Δx | Δy | Δx | Δy | Δx | Δy |
| 45 | 0 | 0 | 0 | 0 | 0 | 0 |
| 46 | 0.0000 | 0.0000 | −0.0007 | −0.0011 | 0.0002 | 0.0003 |
| 47 | 0.0000 | 0.0000 | −0.0014 | −0.0022 | 0.0006 | 0.0007 |
| 48 | 0.0000 | 0.0000 | −0.0023 | −0.0035 | 0.0010 | 0.0012 |
| 50 | 0.0000 | 0.0000 | −0.0043 | −0.0065 | 0.0022 | 0.0025 |
| 55 | 0.0000 | 0.0000 | −0.0107 | −0.0155 | 0.0064 | 0.0072 |
| 60 | 0.0000 | 0.0000 | −0.0189 | −0.0265 | 0.0116 | 0.0129 |

Example 3

Simulations were performed as in Example 1, except that the thickness of the LC retarder was fixed at 1.22 microns and the angle between the slow axis of the COP retarder and the pass axis of the reflective polarizer was varied from 45 to 35 degrees, while the angle between the slow axis of the LC retarder and the pass axis of the reflective polarizer was varied from −45 to −35 degrees. The relative angle between the slow axis of the COP retarder and the slow axis of the LC retarder varied from 90 degrees to 70 degrees.

Figure 5:
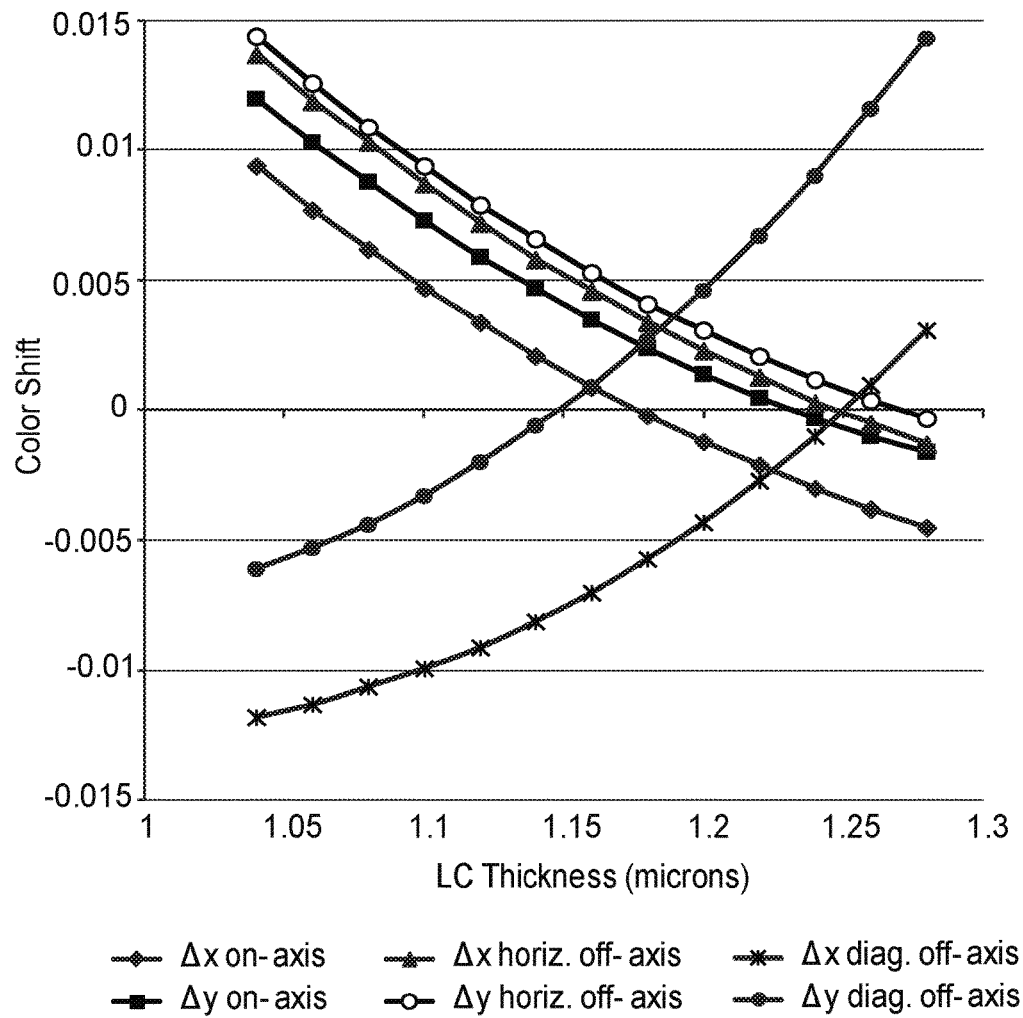
FIG. 5 is a graph showing color shift at various viewing angles as a function of liquid crystal thickness for exemplary optical film stacks.
Figure 8:
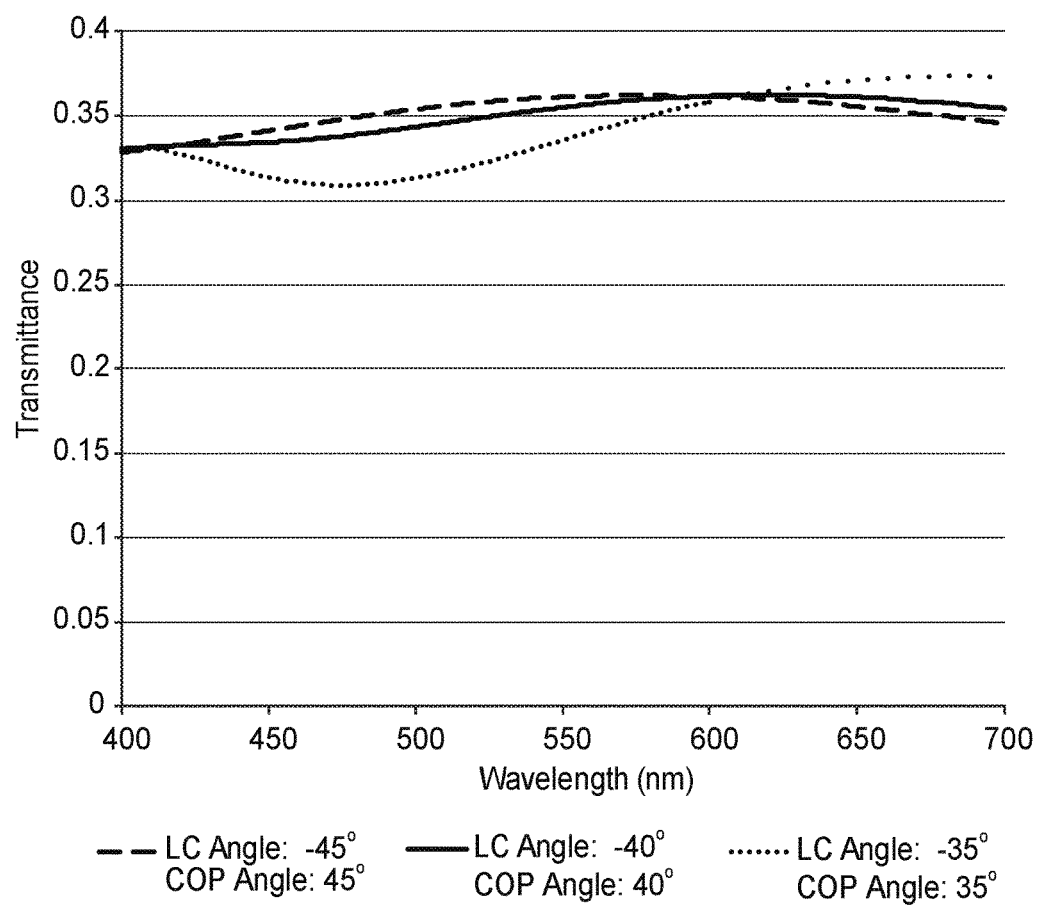
FIG. 8 is a graph showing transmittance as a function of wavelength for different liquid crystal and cyclo-olefin polymer film alignments in exemplary optical film stacks.

Transmittance versus wavelength for three combinations of COP angle and LC angle are shown in FIG. 5. The color shift relative to the case where the COP angle was 45 degrees and the LC angle was −45 degrees is given in Table 11. From FIG. 8 and Table 11, it can be seen that the transmittance and color shift are not very sensitive to small deviations of the COP and LC angles from 45 degrees and −45 degrees, respectively.

TABLE 11

| COP Angle (deg.) | LC Angle (deg.) | $\Theta = 0°, \Phi = 0°$ (On-axis) | | $\Theta = 45°, \Phi = 0°$ (Horizontal off-axis) | | $\Theta = 45°, \Phi = 45°$ (Diagonal off-axis) | |
|---|---|---|---|---|---|---|---|
| | | Δx | Δy | Δx | Δy | Δx | Δy |
| 45 | −45 | 0 | 0 | 0 | 0 | 0 | 0 |
| 40 | −40 | −0.0021 | −0.0002 | 0.0037 | 0.0025 | −0.0124 | −0.0151 |
| 35 | −35 | −0.0077 | −0.0007 | 0.0011 | 0.0013 | −0.0282 | −0.0338 |

The following are exemplary embodiments according to the present disclosure:

Item 1. An optical film stack, comprising:
a reflective polarizer having a top surface, a bottom surface, a transmission axis, and a reflection axis;
an achromatic half-wave retardation layer having a top surface, a bottom surface disposed on the top surface of the reflective polarizer, and a slow axis oriented substantially 45° with respect to the transmission axis of the reflective polarizer; and
an absorbing polarizer having a bottom surface disposed on the top surface of the achromatic half-wave retardation layer and a transmission axis oriented substantially 90° with respect to the transmission axis of the reflective polarizer.

Item 2. An optical film stack, comprising:
a reflective polarizer having a top surface, a bottom surface, a transmission axis, and a reflection axis;
a first retardation layer having a top surface, a bottom surface disposed on the top surface of the reflective polarizer, and a slow axis oriented substantially 45° with respect to the transmission axis of the reflective polarizer;
a second retardation layer having a top surface, a bottom surface disposed on the top surface of the first retardation layer, and a slow axis oriented substantially 45° with respect to the transmission axis of the reflective polarizer and oriented substantially 90° with respect to the slow axis of the first retardation layer; and
an absorbing polarizer having a bottom surface disposed on the top surface of the second retardation layer and a transmission axis oriented substantially 90° with respect to the transmission axis of the reflective polarizer;
wherein together the first and second retardation layers are configured as an achromatic half-wave retardation layer.

Item 3. An optical film stack, comprising:
a tuned reflective polarizer having a top surface, a bottom surface, a transmission axis, and a reflection axis;
a half-wave retardation layer having a top surface, a bottom surface disposed on the top surface of the reflective polarizer, and a slow axis oriented substantially 45° with respect to the transmission axis of the reflective polarizer; and
an absorbing polarizer having a bottom surface disposed on the top surface of the half-wave retardation layer and a transmission axis oriented substantially 90° with respect to the transmission axis of the reflective polarizer;
wherein the tuned reflective polarizer is tuned to reduce wavelength dispersion of the half-wave retardation layer.

Item 4. The optical film stack of item 2, wherein the first retardation layer is a three-quarters-wave retardation layer and the second retardation layer is a quarter-wave retardation layer.

Item 5. The optical film stack as in any of items 1-3, further comprising a quarter-wave retardation layer disposed on the bottom surface of the reflective polarizer.

Item 6. The optical film stack as in either of items 2 or 4, wherein the second retardation layer includes a liquid crystal layer.

Item 7. The optical film stack as in any of items 2, 4, or 6, wherein the first retardation layer includes a film.

Item 8. The optical film stack of item 6, wherein the liquid crystal layer has a thickness of between 1 and 1.3 microns.

Item 9. The optical film stack of item 6, wherein the liquid crystal layer has a thickness of between 1.18 and 1.24 microns.

Item 10. The optical film stack of item 1, wherein a retardation value of the achromatic half-wave retardation layer varies directly with a wavelength of visible light.

Item 11. The optical film stack of item 1, wherein the achromatic half-wave retardation layer is attached to the absorbing polarizer with at least one of a pressure sensitive adhesive, a UV curable adhesive, or a polyvinyl alcohol type adhesive.

Item 12. The optical film as in any of items 1-3, wherein substantially 45° means not less than 35° and not more than 55°.

Item 13. The optical film as in any of items 1-3, wherein substantially 45° means not less than 40° and not more than 50°.

Item 14. The optical film as in any of items 1-3, wherein substantially 45° means not less than 44° and not more than 46°.

Item 15. The optical film as in any of items 1-3, wherein substantially 90° means not less than 80° and not more than 100°.

Item 16. The optical film as in any of items 1-3, wherein substantially 90° means not less than 85° and not more than 95°.

Item 17. The optical film as in any of items 1-3, wherein substantially 90° means not less than 89° and not more than 91°.

Item 18. A roll of film, comprising the optical film stack as in any one of the preceding items.

Descriptions for elements in figures should be understood to apply equally to corresponding elements in other figures, unless indicated otherwise. The present invention should not be considered limited to the particular embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. An optical film stack, comprising:
a reflective polarizer having a top surface, a bottom surface, a transmission axis, and a reflection axis;
an achromatic half-wave retardation layer having a top surface, a bottom surface disposed on the top surface of the reflective polarizer, and a slow axis oriented substantially 45° with respect to the transmission axis of the reflective polarizer; and an absorbing polarizer having a bottom surface disposed on the top surface of the achromatic half-wave retardation layer and a transmission axis oriented substantially 90° with respect to the transmission axis of the reflective polarizer.

2. The optical film stack of claim 1, further comprising a quarter-wave retardation layer disposed on the bottom surface of the reflective polarizer.

3. The optical film stack of claim 1, wherein a retardation value of the achromatic half-wave retardation layer varies directly with a wavelength of visible light.

4. A roll of film, comprising the optical film stack of claim 1.

5. An optical film stack, comprising:
a reflective polarizer having a top surface, a bottom surface, a transmission axis, and a reflection axis;
a first retardation layer having a top surface, a bottom surface disposed on the top surface of the reflective polarizer, and a slow axis oriented substantially 45° with respect to the transmission axis of the reflective polarizer;
a second retardation layer having a top surface, a bottom surface disposed on the top surface of the first retardation layer, and a slow axis oriented substantially 45° with respect to the transmission axis of the reflective polarizer and oriented substantially 90° with respect to the slow axis of the first retardation layer; and
an absorbing polarizer having a bottom surface disposed on the top surface of the second retardation layer and a transmission axis oriented substantially 90° with respect to the transmission axis of the reflective polarizer;

wherein together the first and second retardation layers are configured as an achromatic half-wave retardation layer.

6. The optical film stack of claim 5, wherein the first retardation layer is a three-quarters-wave retardation layer and the second retardation layer is a quarter-wave retardation layer.

7. The optical film stack as in claim 5, wherein the second retardation layer includes a liquid crystal layer.

8. The optical film stack of claim 7, wherein the liquid crystal layer has a thickness of between 1 and 1.3 microns.

9. The optical film stack as in claim 5, wherein the first retardation layer includes a film.

* * * * *